Oct. 24, 1933.  J. M. PHILLIPS  1,931,995
ADVERTISING DEVICE
Filed Nov. 18, 1930
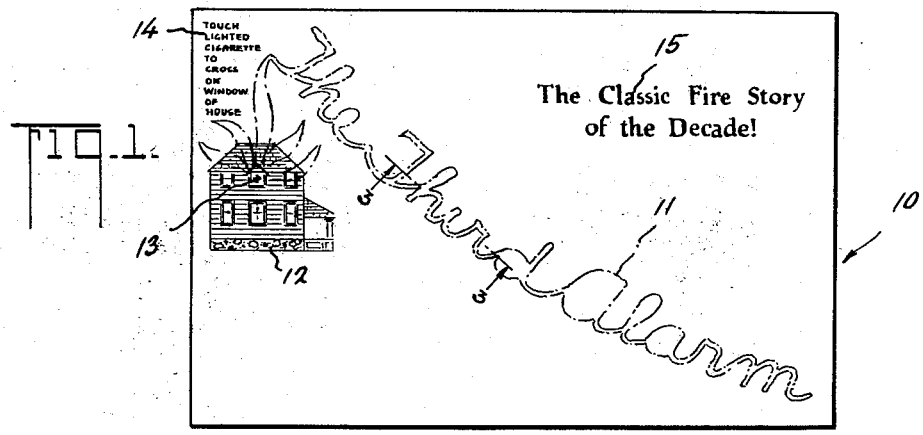
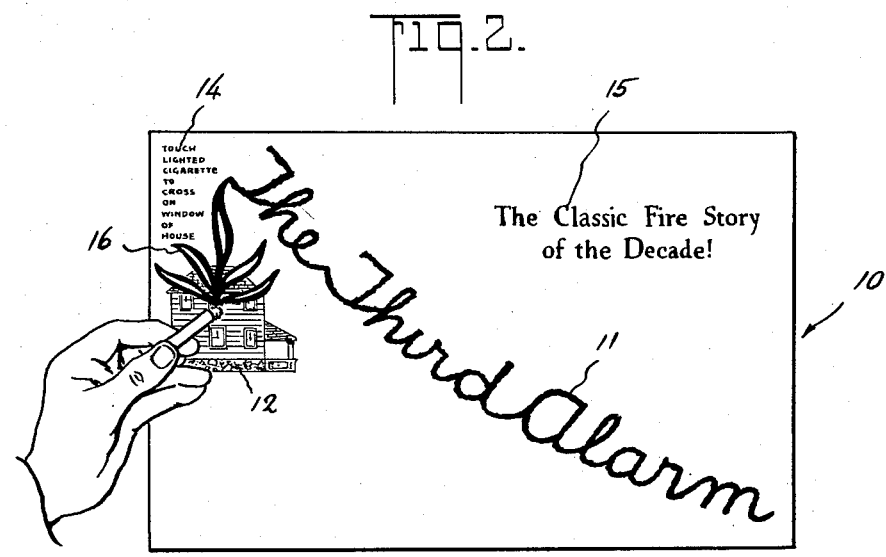
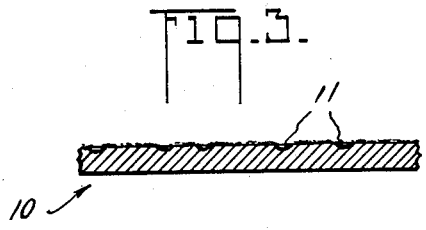
INVENTOR
JERRY M. PHILLIPS
BY
John P. Chandler
ATTORNEY Patented Oct. 24, 1933

1,931,995

UNITED STATES PATENT OFFICE 1,931,995

ADVERTISING DEVICE

Jerry M. Phillips, New York, N. Y.

Application November 18, 1930
Serial No. 496,382

9 Claims. (Cl. 40—130)

This invention relates to amusement and advertising and display devices and more particularly to a pyrotechnic picture to be used for advertising and the like.

One object of the invention is to provide a novel pyrotechnic advertising or display device which is exceedingly effective for its practical purposes of advertising and entertainment as well as harmless to use.

The invention contemplates the provision of a device consisting of a sheet of inflammable material, such as paper or the like, upon which is written or impressed an outline of a design, a word, or series of words, using for the production of the outline a solution formed of ignitable material which is practically invisible when dry on the paper or other foundation material, so that when any part of the dried solution is ignited by the tip of a lighted cigarette, cigar or the like, the impregnated foundation will burn out the design or words upon or through the paper. Its usefulness and value as an advertising medium is obvious. For example a store may distribute a large number of the devices and have printed thereon words such as "What is the best store in town". The name of the store may be invisibly written on the device with instructions and a mark or other indicia showing where to apply the igniting medium, which is preferably a conveniently obtainable cigar or cigarette. It is also highly effective for advertising shows, motion pictures, merchandise and, in fact, is utilizable as a medium for practically any advertising or display purpose.

Another object of the invention is to provide a harmless amusement device for children, and, as well, adults.

Still another object of the invention is to provide improvements in ignitable solutions for placing on inflammable materials such as paper and the like, said solution being practically invisible after it has been applied to the paper and has dried; and which, when the same is ignited in the proper place, will burn evenly and rather rapidly and without a flame, thereby being perfectly safe for use.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification and fully illustrated in the accompanying drawing, which latter shows embodiments of the invention as at present preferred.

In said drawing:

Fig. 1 is a plan view of the embodiment showing one of its many uses and indicating in broken lines the position of practically invisible words thereon.

Fig. 2 is a plan view of the same after the words thereon have been burned out.

Fig. 3 is an enlarged detailed section on line 3—3 of Fig. 1.

Referring now more particularly to said drawing, the embodiment, as at present preferred, includes a sheet of inflammable material 10, said material being preferably a rather thin paper of tissue quality. On this sheet are placed a word or series of words 11 in the manner hereinafter described, the words or series of words being initially undecipherable or otherwise practically undistinguishable. The place for igniting the words may be indicated in any suitable manner, depending upon what the embodiment refers to. The embodiment illustrated herein refers to a motion picture of a large fire. In this instance I provide a picture of a house 12 with indicia, here shown as a cross mark 13 indicating the exact place where the lighted cigarette preferably is to be applied. Suitable instructions 14 are printed nearby. Likewise suitable advertising data 15 having a relation to the normally invisible words 11 may be placed in any desired position on the sheet.

In addition to the words 11 I sometimes provide a suggestive Figure 16, in this instance to indicate the burning of the house.

When the article is ignited in the suitable place the fire rapidly and evenly travels to all parts of the design, and without producing any flame, leaving a continuous burn or void in the outline of the design or words formed by the combustible material, and thus explaining or amplifying the significance of the data 15.

The ignitable material, preferably a solution, which I apply to the paper, may be made in a variety of ways. I have heretofore, with excellent results, used potassium nitrate, fine cornstarch and water. I take one-half pound of the potassium nitrate and mix the same while dry with approximately three tablespoonfuls of cornstarch. After the lumps have been removed, which may require fine screening in some instances, I add a pint of water, which I stir until the entire solution is thoroughly mixed. I then heat the solution until the solution comes to a boil, stirring the same in order to prevent any caking. The pan containing the solution may then be placed on wet sand to cool, the sand preventing lumps from forming. I then stir the mixture further until the solution is perfectly smooth. Sodium nitrate may be used in place of the potassium nitrate, if desired. The fine cornstarch included in the combustible composition acts to break up the combustible ingredients and retard the combustion so that the same, when applied to the paper, burns without flame, and it also serves as a foundation to hold a substantial, though not discernable, quantity of the ingredients of the solution.

The solution may now be applied to the paper 10 in any suitable manner. I generally prefer the "silk screen" method, for this purpose. I mount a piece of fine silk in a frame, and mark out the design in the form of a stencil. I then cover the balance of the silk with a suitable lacquer, or with a water-color preparation, or any other suitable solution which, when dry, will be impervious to my ignitable solution.

The sheet 10 is placed under the silk screen and a quantity of the solution is poured on top of the silk screen. A roller is then passed over the screen one or more times, in order to force the solution through the silk and into the sheet. The impregnated sheet is then removed and allowed to dry.

The presence of the solution, when dry, is scarcely perceptible, except for a slight crinkling of the paper at this point.

It will be appreciated that the solution may be applied to the paper in any other manner known to the art, such as by printing and the like. It will also be obvious that a large variety of designs and words may be placed upon the sheet, making the invention adaptable for a wide variety of types of advertising and displays.

The hereinbefore described construction and methods admit of considerable modification without departing from the invention; therefore, it is the wish not to be limited to the precise methods and arrangements herein shown and described, which are, as aforesaid, by way of illustration merely. In other words, the scope of protection contemplated is to be taken solely from the appended claims, interpreted as broadly as is consistent with the prior art.

I claim:

1. In a device of the class described, a sheet of inflammable material having a plurality of words marked thereon by applying an ignitable solution to form said words, said words being normally undistinguishable at both sides of said sheet and being combustible to convey an intelligible word message, the ignitable solution including a binder having a lower combustion point than said solution, whereby the combustion of said ignitable solution is delayed.

2. An advertising and amusement device including a sheet of inflammable material composed of thin paper, said sheet having a portion impregnated with combustible material, said impregnated portion being practically undistinguishable at both sides of said sheet and being adapted to convey an intelligible word message when combusted said sheet including indicia at a part of said impregnated portion to indicate the point of ignition, the combustible material including a binder having lower combustion qualities than the combustible material, said binder acting as a combustion retarding agent.

3. An article of advertising and amusement and the like including a sheet of inflammable material composed of thin paper, and having visible advertising matter thereon, said sheet having a portion thereof impregnated with combustible material in an outline having a relation to said advertising matter and being adapted to convey a permanent intelligible word message when said combustible material has been consumed, said sheet including indicia at a part of said impregnated portion to indicate the point of ignition at one terminus of said impregnated portion, the combustible material including a binder having lower combustion qualities than the combustible material, said binder acting as a combustion retarding agent.

4. An article of advertising and the like including a sheet of inflammable material composed of thin paper, said sheet having a portion thereof impregnated with combustible material, the impregnated portion constituting a fanciful design normally practically invisible at both sides of said sheet, the combustible material including a binder having lower combustion qualities than the combustible material, said binder acting as a combustion retarding agent.

5. An advertising or display device including a sheet of inflammable material, said sheet having a portion thereof impregnated with combustible material in an irregular fanciful path to produce a fanciful design normally indistinguishable at both sides of said sheet, the impregnated portion of said sheet being ignitable to consume said impregnated portion and produce a distinguishable void corresponding to said fanciful design, said distinguishable void conveying a permanent intelligible word message, the combustible material including a binder having lower combustion qualities than the combustible material, said binder acting as a combustion retarding agent.

6. In a device of the class described, a sheet of inflammable material and a plurality of normally undecipherable words marked thereon by applying an ignitable composition to said material to form said words, said composition including a bulk adding material having lower combustion qualities than the ignitable composition, said bulk adding material functioning as a combustion retarding agent whereby the said ignitable composition is combustible without flame.

7. An article of advertising, amusement and the like, comprising, in combination, a sheet of thin paper having advertising matter printed on one portion of its face, said sheet having another portion impregnated with a combustible material applied thereto in the outline of a fanciful slogan having a particular explanatory relation to said printed advertising matter, said impregnated portion being normally undistinguishable at both sides of said sheet and said fanciful slogan being normally indecipherable, said sheet including, at still another portion, additional printed matter relating to the context of said slogan and also suitable printed instructions and indicia to indicate the point of ignition of said combustible material, said combustible material being suitably ignitable to consume said impregnated portion without flame and produce a distinguishable void corresponding to said fanciful slogan.

8. An article of advertising, amusement and the like, including, in combination, a sheet of material having certain matter printed on a portion of its face, said sheet having another portion treated with combustible material in a fanciful outline having a particular explanatory relation to said certain matter, said impregnated portion being normally undistinguishable at both sides of said sheet and said fancifully outlined combustible material being normally undecipherable, said sheet including, at still another portion, additional matter relating to the context of said fancifully outlined combustible material portion and also instructive indicia to indicate the point of ignition of said combustible material, said combustible material being suitably ignitable to consume said impregnated portion and produce a distinguishable void corresponding to said fancifully outlined impregnated portion.

9. A device of the class described in claim 6 wherein the bulk adding material is starch.

JERRY M. PHILLIPS.